(12) United States Patent
Harrington

(10) Patent No.: US 11,613,925 B2
(45) Date of Patent: Mar. 28, 2023

(54) PET PORTAL WITH INTEGRATED AND REPLACEABLE GROOMING SYSTEM

(71) Applicant: Lisa N. Harrington, Boston, MA (US)

(72) Inventor: Lisa N. Harrington, Boston, MA (US)

( * ) Notice: Subject to any disclaimer, the term of this patent is extended or adjusted under 35 U.S.C. 154(b) by 151 days.

(21) Appl. No.: 16/533,205

(22) Filed: Aug. 6, 2019

(65) Prior Publication Data

US 2020/0040650 A1    Feb. 6, 2020

Related U.S. Application Data

(60) Provisional application No. 62/714,907, filed on Aug. 6, 2018.

(51) Int. Cl.
*E06B 7/32* (2006.01)
*A01K 13/00* (2006.01)

(52) U.S. Cl.
CPC .............. *E06B 7/32* (2013.01); *A01K 13/004* (2013.01)

(58) Field of Classification Search
CPC ............... A01K 13/002; A01K 15/024; A01K 13/004; E06B 7/32
See application file for complete search history.

(56) References Cited

U.S. PATENT DOCUMENTS

| | | | | |
|---|---|---|---|---|
| 1,229,094 A * | 6/1917 | Knerr | ................ | A01K 13/004 119/656 |
| 1,582,144 A * | 4/1926 | Pflaum | ................ | A01K 13/004 119/658 |
| 2,380,842 A * | 7/1945 | Heesefredl | ........... | A01K 13/004 119/658 |
| 2,441,058 A * | 5/1948 | Carwile | ............... | A01K 13/004 119/622 |
| 2,976,841 A * | 3/1961 | Scheffer | ............... | A01K 13/002 119/622 |
| 4,938,169 A * | 7/1990 | Barmakian | ............ | A01K 1/035 119/484 |
| 5,458,088 A * | 10/1995 | Owens | ................... | A01K 1/035 119/622 |
| 5,546,895 A * | 8/1996 | Brown | ................ | A01K 13/004 119/484 |
| 5,755,183 A * | 5/1998 | Udelle | ................ | A01K 13/002 119/622 |
| 9,986,719 B1 * | 6/2018 | Sanders | ............... | A01K 13/004 |

(Continued)

FOREIGN PATENT DOCUMENTS

| | | | | |
|---|---|---|---|---|
| CN | 109511571 A | * | 3/2019 | ........... A01K 13/002 |
| DE | 461582 C | * | 6/1928 | ............. A01K 1/033 |

(Continued)

OTHER PUBLICATIONS cathole.com, Installation Instructions, 2015, https://cathole.com/wp-content/uploads/Instructions-Sheet-2015.pdf (Year: 2015).*

*Primary Examiner* — Magdalena Topolski
(74) *Attorney, Agent, or Firm* — Camille A. Wilson; Wilson Dutra, PLLC

(57) ABSTRACT

An apparatus for removably attaching a brush to the interior of a portal whereby a flexible brush backing to which the brush is attached is slid into, and retained by, grooves in the portal. The brush backing is removable from the portal without removing the portal from the door, wall, or other article into which the portal is installed.

7 Claims, 10 Drawing Sheets

(56) References Cited

U.S. PATENT DOCUMENTS

| | | | | |
|---|---|---|---|---|
| 2011/0232579 A1* | 9/2011 | Clayson | ................... | E06B 7/32 |
| | | | | 119/622 |
| 2017/0135314 A1* | 5/2017 | Chura | .................. | A01K 13/004 |
| 2017/0303507 A1* | 10/2017 | Kuo | .................... | A01K 13/004 |

FOREIGN PATENT DOCUMENTS

| | | | | | |
|---|---|---|---|---|---|
| DE | 2516076 | A1 | * | 10/1976 | ........... A01K 13/004 |
| DE | 3425300 | A1 | * | 1/1986 | ........... A01K 13/004 |
| DE | 202010003876 | U1 | * | 7/2010 | ............. A01K 1/035 |
| GB | 590342 | A | * | 7/1947 | ........... A01K 13/004 |
| GB | 2423010 | A | * | 8/2006 | ........... A01K 13/004 |

\* cited by examiner

PET PORTAL WITH INTEGRATED AND REPLACEABLE GROOMING SYSTEM

CROSS-REFERENCE TO RELATED APPLICATIONS

This application claims priority to provisional application 62/714,907 filed on Aug. 6, 2018.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not Applicable

STATEMENT REGARDING PRIOR DISCLOSURES BY AN INVENTOR OR JOINT INVENTOR

Not Applicable

BACKGROUND OF THE INVENTION

People often desire to grant restricted access to areas of their homes to pets. This is often done with pet doors (openings with a movable flap to cover the opening) or portals (openings with no flap to cover the opening). Pet doors are popular to permit access and egress to animals on exterior walls and doors. Portals are popular between interior spaces. By selecting a portal of an appropriate size, smaller animals may pass through and larger animals be prevented from passing through. Providing a space for small animals to which large animals cannot enter can provide an isolated and peaceful place to which a small animal may escape when it needs some isolation.

It is also common to seek to keep dogs away from cat litter boxes since dogs may seek to eat cat feces. Placing a litter box in an area separated from general living space by a portal can allow a cat to access the litter box when necessary while also preventing a dog from eating feces from the litter box since a cat may be small enough to pass through the portal and a dog may be too large to pass through the portal.

In addition to providing for selective passage, portals may be equipped with other features such as brushes. When equipped with a brush, a portal may permit an animal passing through the portal to groom or scratch on the brush bristles. The brush can also remove loose hair thereby reducing the amount of loose hair otherwise distributed around one's home. With repeated passage, hair often accumulates on the brush requiring cleaning. While hair may be manually removed from the brush while the brush is held in the portal, this can be inconvenient to work near ground-level to remove hair from the brush bristles. For that reason, portals with brushes may be configured to permit the brush to be removed from the portal for cleaning and replacement when necessary.

BRIEF SUMMARY OF THE INVENTION

An apparatus for removably attaching a brush to the interior of a portal whereby a flexible brush backing to which the brush is attached is slid into, and retained by, grooves in the portal. The brush backing is removable from the portal without removing the portal from the door, wall, or other article into which the portal is installed.

DETAILED DESCRIPTION OF THE INVENTION

Figure 1:
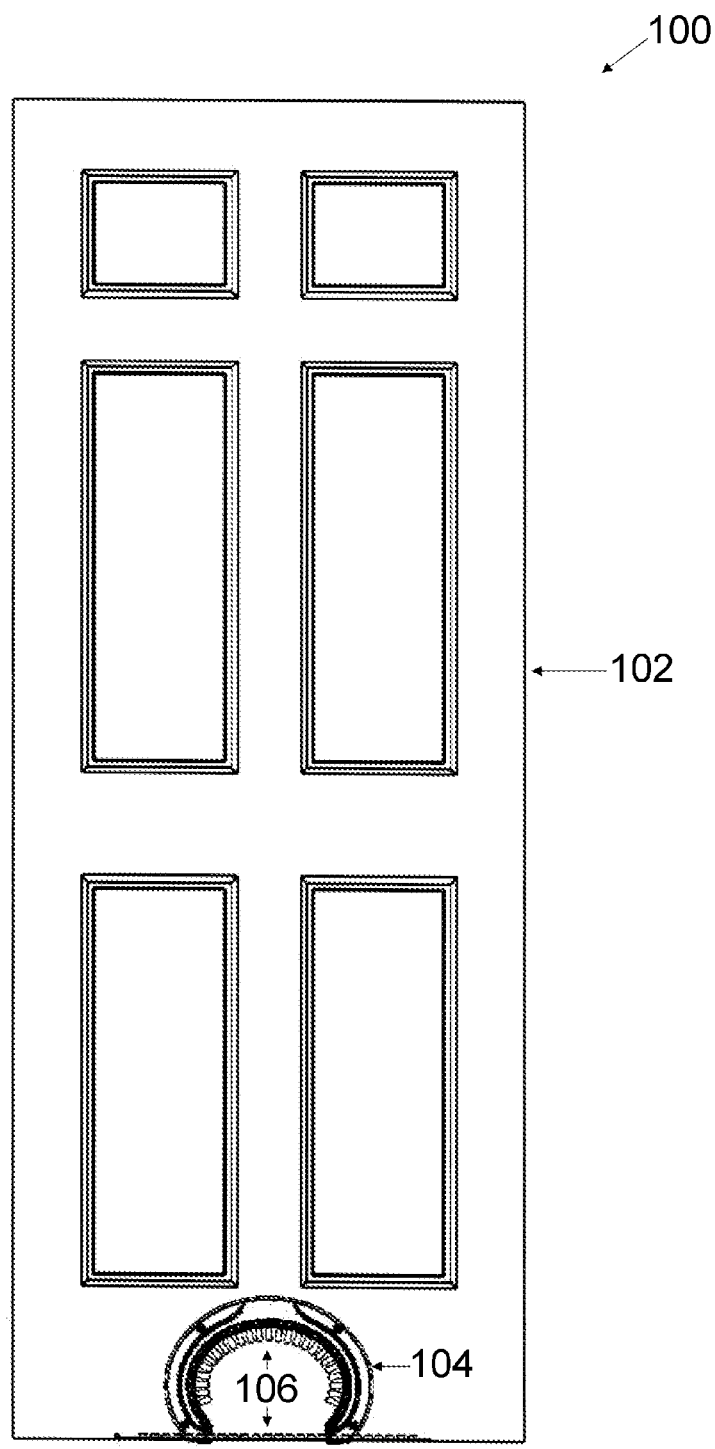
FIG. 1 is a front orthogonal view of the pet portal grooming system installed in a door.

FIG. 1 illustrates a pet portal grooming system 100, according to an embodiment. The pet portal grooming system 100 includes a door 102, a pet portal 104, and a pet portal brush 106 that is removably integrated into the pet portal 104, according to an embodiment. The pet portal brush 106 slides into a portion of an inner circumference of the pet portal 104, according to an embodiment. The pet portal 104 includes grooves that receive, carry, and retain the pet portal brush 106 within an aperture in the door 102 that is at least partially defined by the pet portal 104. The pet portal brush 106 may be slidably removed and inserted into the pet portal 104 to facilitate replacement of the pet portal brush 106, for example, after the bristles of the pet portal brush 106 become worn, dirty, or otherwise in need of replacement or removal from the pet portal 104, according to an embodiment.

Figure 2:
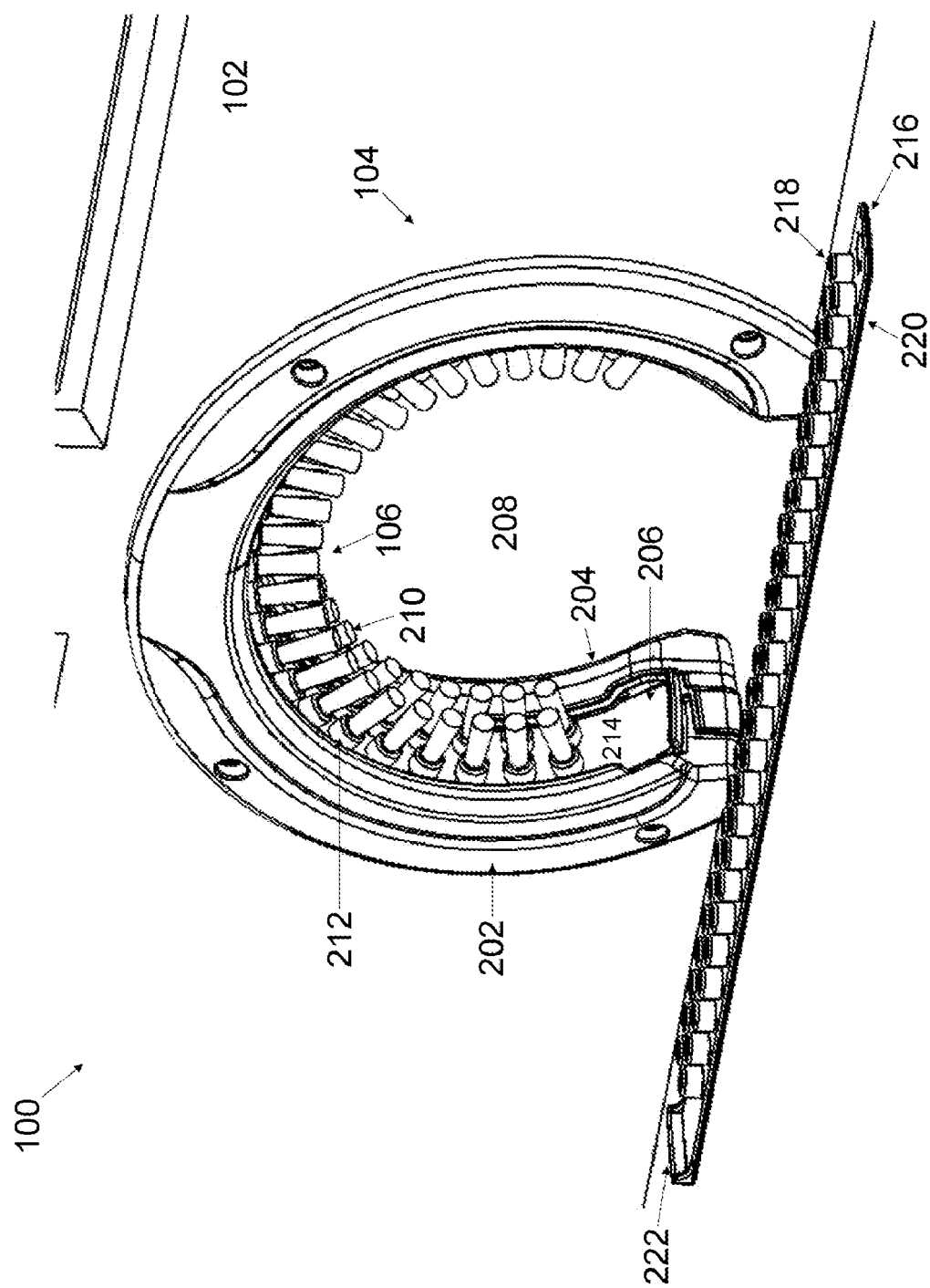
FIG. 2 is a side perspective view of the pet portal grooming system installed in a door.

FIG. 2 illustrates a perspective view of the pet portal grooming system 100, according to an embodiment. The pet portal 104 includes a first circular frame 202 and a second circular frame 204 that mate together from 2 sides of the door 102 to provide a frame that secures the pet portal brush 106 in place. The first circular frame 202 and the second circular frame 204 may at least partially defined an opening 206 into which the pet portal brush 106 may be inserted (slid) into grooves defined by the first circular frame 202 and the second circular frame 204. The grooves defined by the first circular frame 202 and the second circular frame 204 enable the pet portal brush to be inserted into the track opening 206 and manipulated around an inner circumference of the pet portal 104 so that the pet portal brush 106 is generally directed toward an aperture 208 that is defined by the pet portal 104 in the door 102, according to an embodiment. The pet portal brush 106 includes a plurality of bristles 210 that are secured by a plurality of cups 212 that are attached or coupled to a brush backing 214. The brush backing 214 may be made from one or more of a number of flexible materials that can carry the cups 212 and can be flexibly mounted within the pet portal 104. As an example, the brush backing 214 may be manufactured from polyethylene. The brush backing 214 and the cups 212 may be manufactured using injection molding. The partial pet portal brush 216 illustrates another perspective view of a straightened pet portal brush and illustrates a plurality of cups 218 and a brush backing 220. The pet portal brush 106 and the partial pet portal brush 216 may include a lip 222 that is a raised tab that facilitates pulling the pet portal brush 106 from the pet portal 104. The width 222 may also function as a stop to obstruct over-insertion of the pet portal brush 106 into the pet portal 104.

Figure 3:
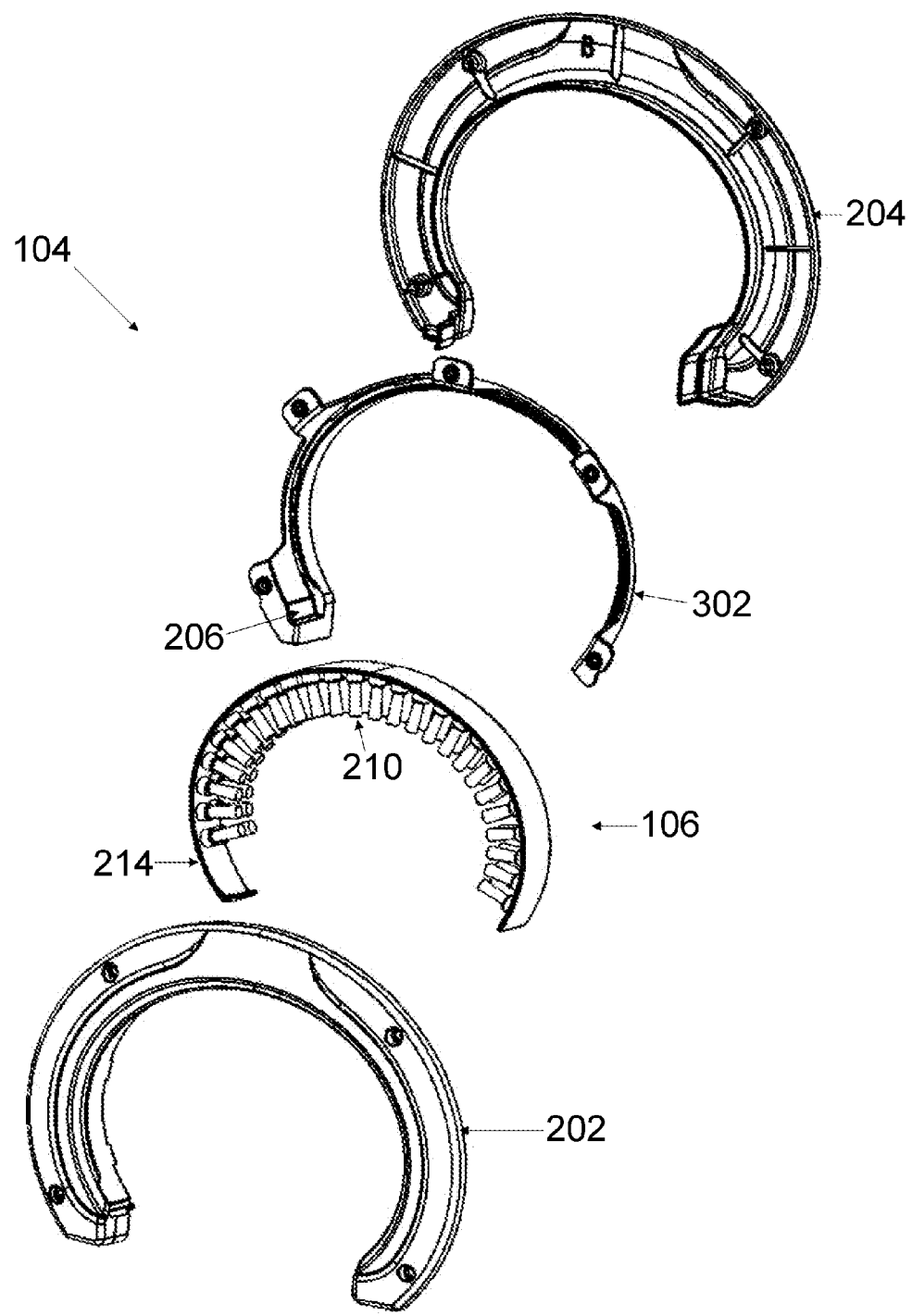
FIG. 3 is an exploded perspective view of the pet portal grooming system.

FIG. 3 is an exploded perspective view of the pet portal 104. The pet portal 104 may include a third frame 302 that is secured between the first circular frame 202 and the second circular frame 204. The third circular frame 302 may at least partially define the track opening 206 into which the brush backing 214 is inserted.

Figure 4:
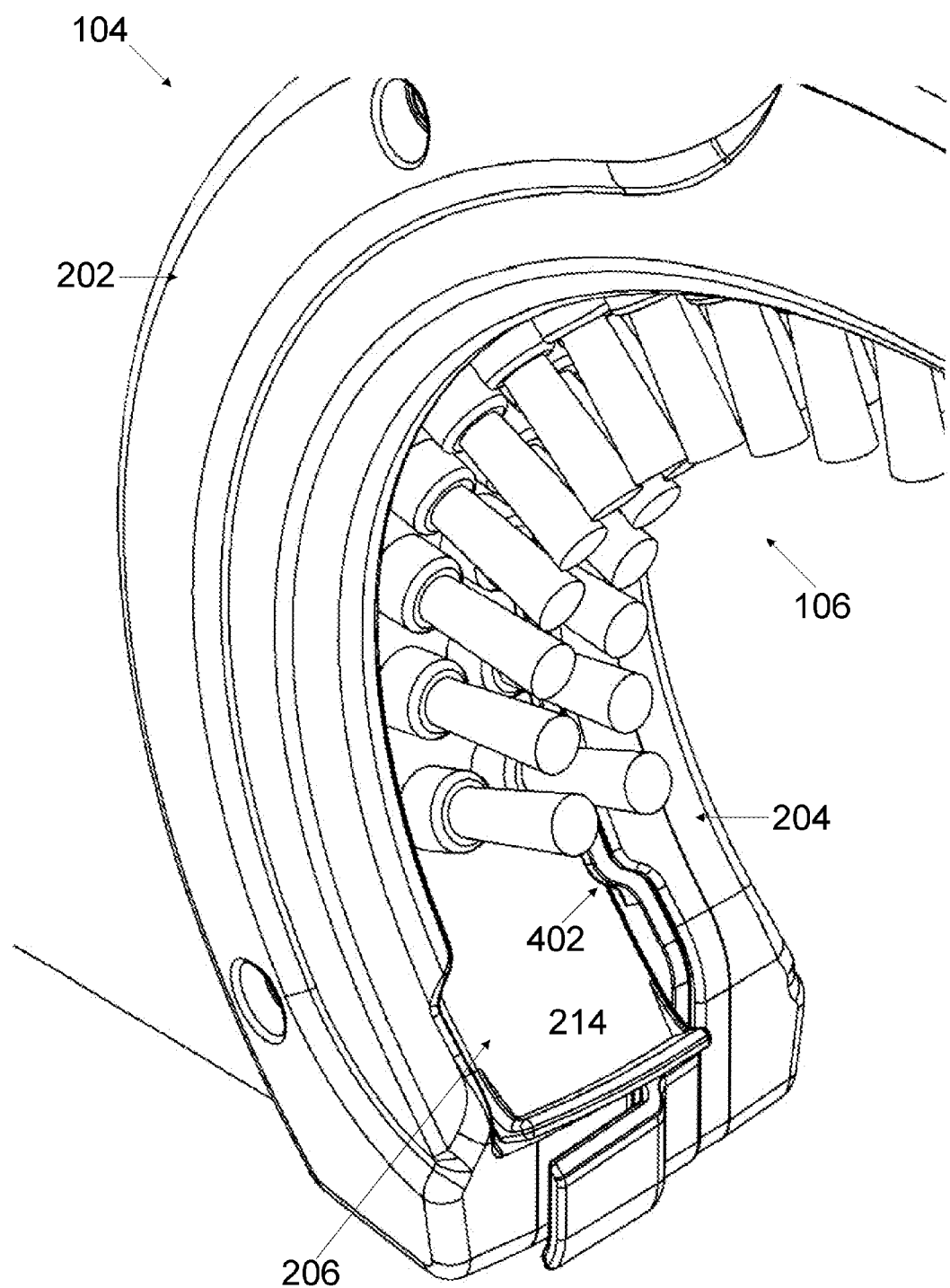
FIG. 4 is a close-up perspective view of a portion of the pet portal grooming system.

FIG. 4 illustrates a close-up perspective view of a portion of the pet portal 104. The brush backing 214 is secured by a track 402 that is at least partially defined by grooves, recesses, and/or lips that at least partially cover and retain the brush backing 204. The track opening 206 generally enables the brush backing 214 to be inserted into the track 402.

Figure 5:
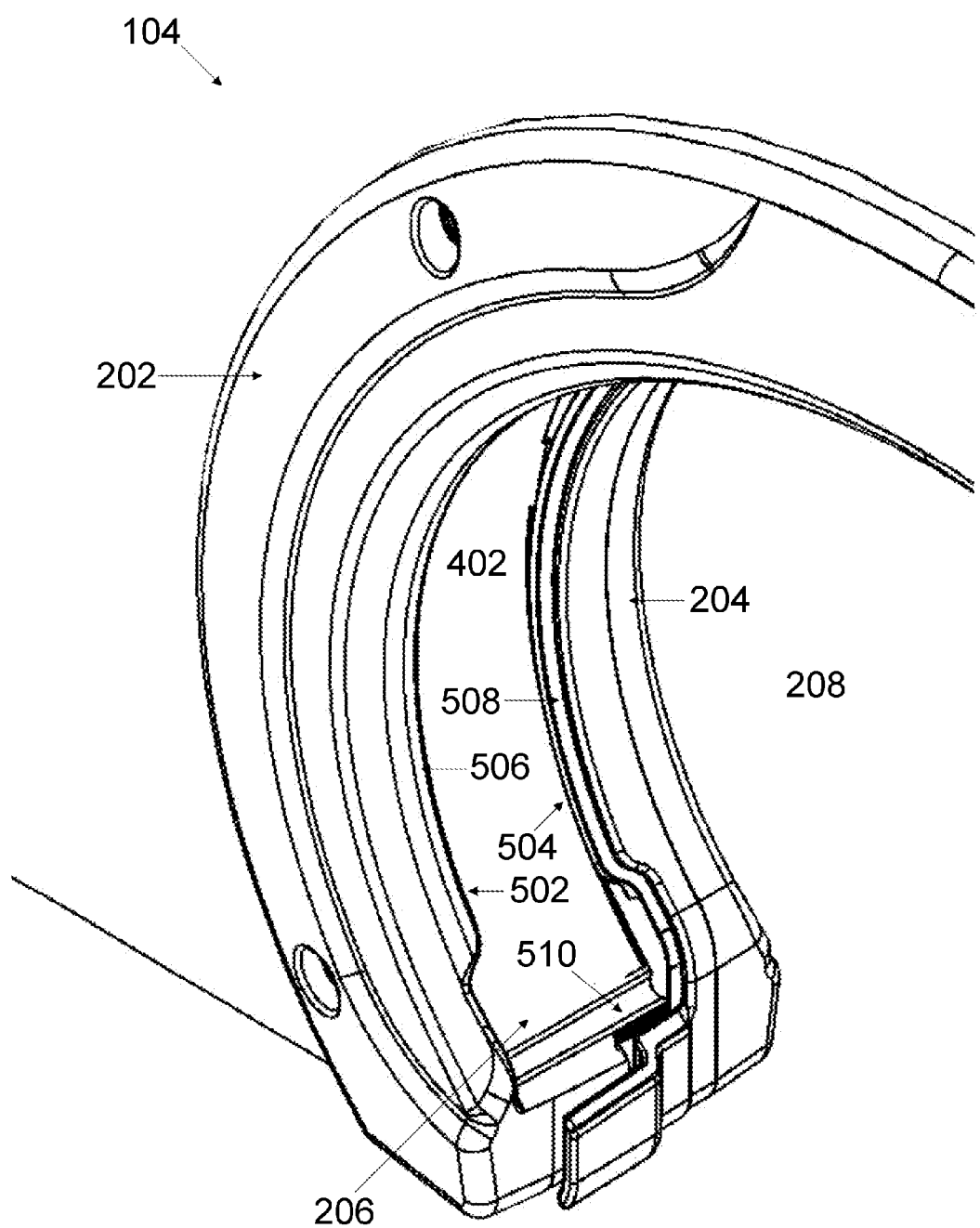
FIG. 5 is a close-up perspective view of a portion of the pet portal grooming system.

FIG. 5 illustrates a close-up perspective view of a portion of the pet portal 104, without the pet portal brush 106. As illustrated, the track 402 has an opening 206 and includes a first groove 502 and a second groove 504 that are defined within the first and second circular frames 202, 204. The first and second grooves 502, 504 are recesses within the first and second circular frames 202, 204 and defined lip 506, 508 that at least partially make contact with the pet portal brush 106 to retain the brush backing 214 within and inner circumference of the pet portal 104. Track 402 is further configured with a depression 510 configured to interact with a feature of brush backing 214 to provide a mechanical resistance to the removal of brush backing 214.

Figure 6:
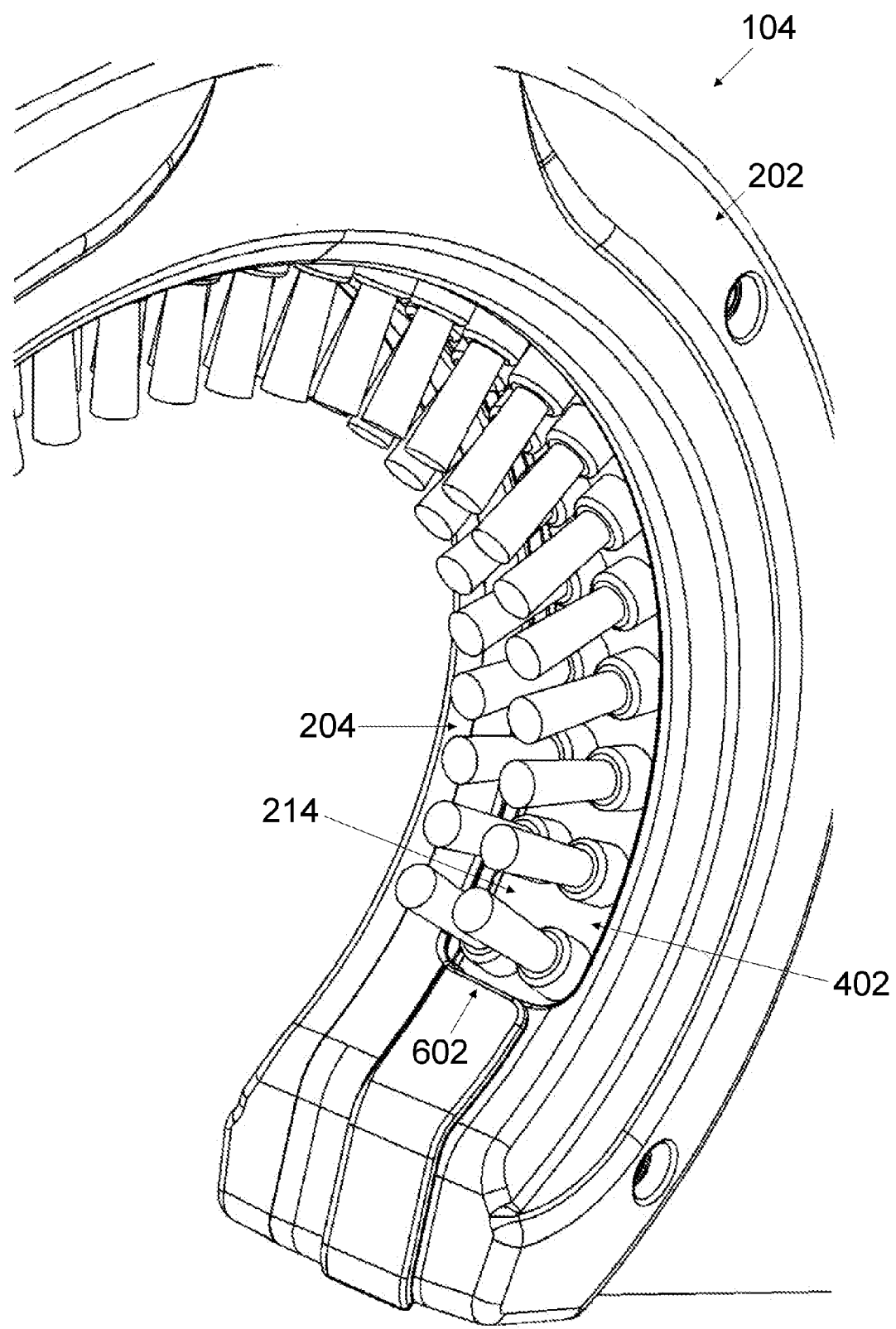
FIG. 6 is a close-up perspective view of a portion of the pet portal grooming system.

FIG. 6 illustrates a close-up perspective view of a portion of the pet portal 104. As illustrated, the brush backing 214 is at least partially secured by a track that is illustrated as a partial opening within the first and second circular frames 202, 204. The track 402 includes a track termination 602 that defines an end of the track 402 and presents travel of the brush backing to 214 in the track 402.

Figure 7:
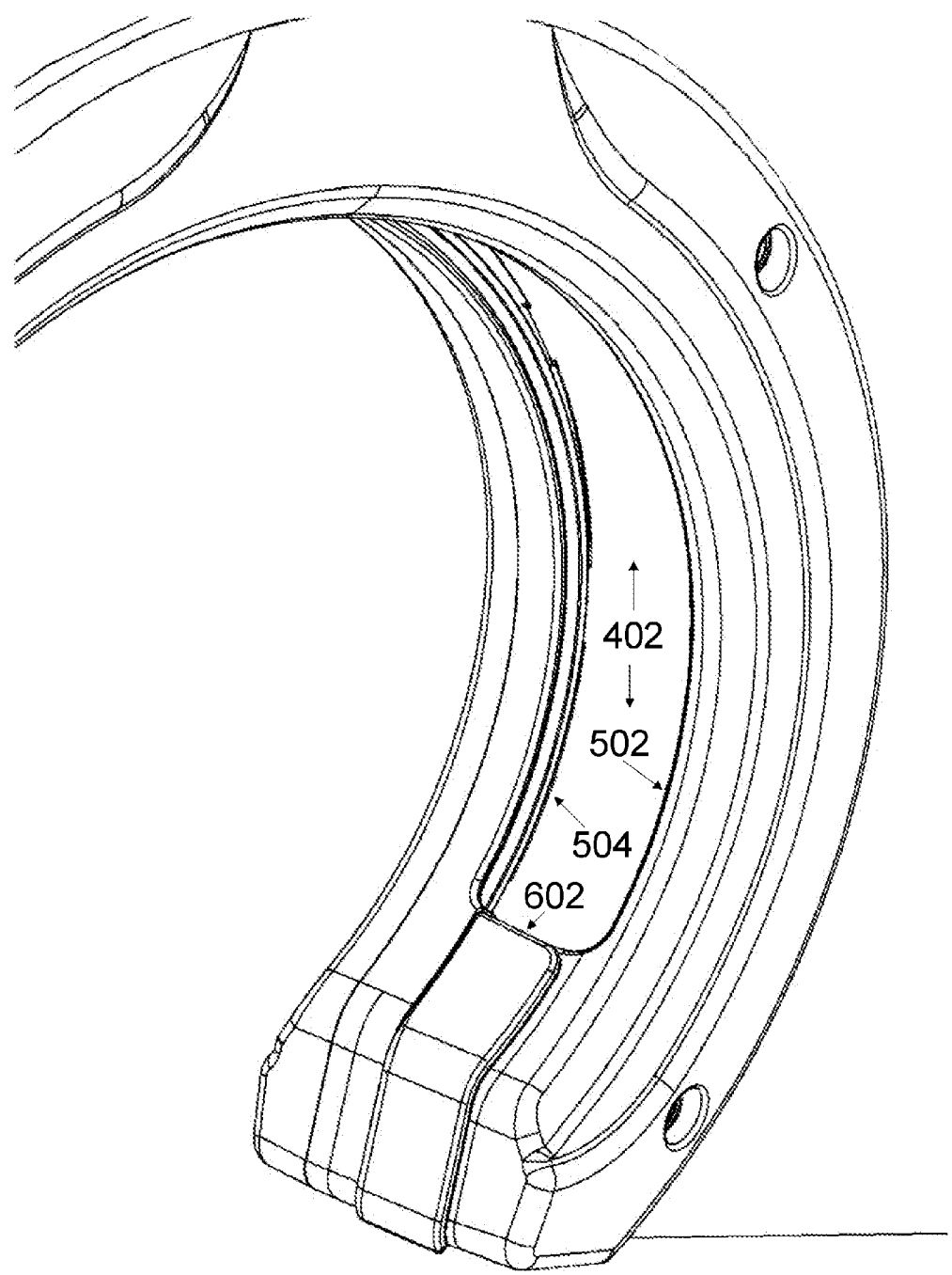
FIG. 7 is a close-up perspective view of a portion of the pet portal, without the pet portal brush installed.

FIG. 7 illustrates a close-up perspective view of a portion of the pet portal 104, without the pet portal brush 106.

Figure 8:
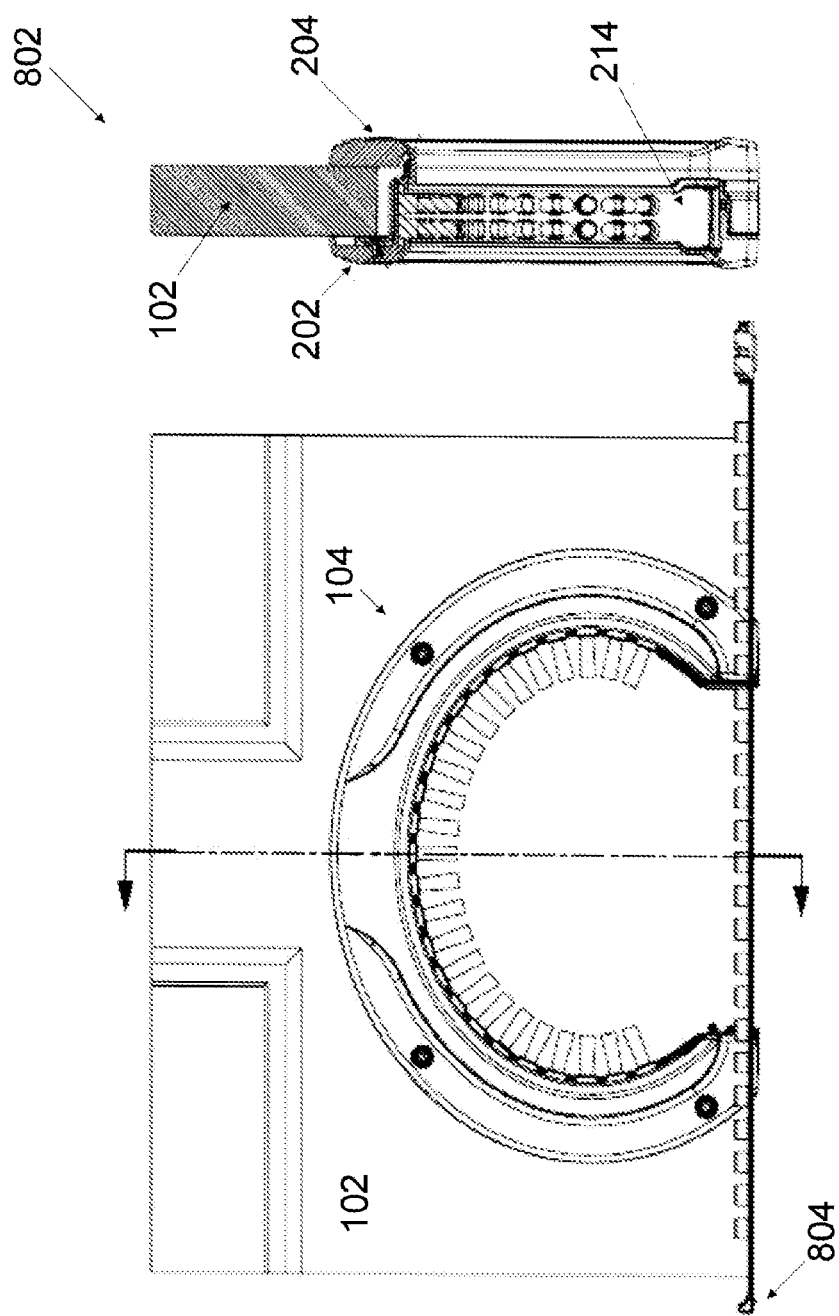
FIG. 8 is a cross-sectional view 802 of a portion of the pet portal grooming system.

FIG. 8 illustrates a cross-sectional view 802 of a portion of the pet portal 104. FIG. 8 further illustrates a protrusion 804 on the side of brush backing 214 opposite the cups 212 configured to interact with a depression 510 in the track to provide a mechanical resistance to the removal of brush backing 214.

Figure 9:
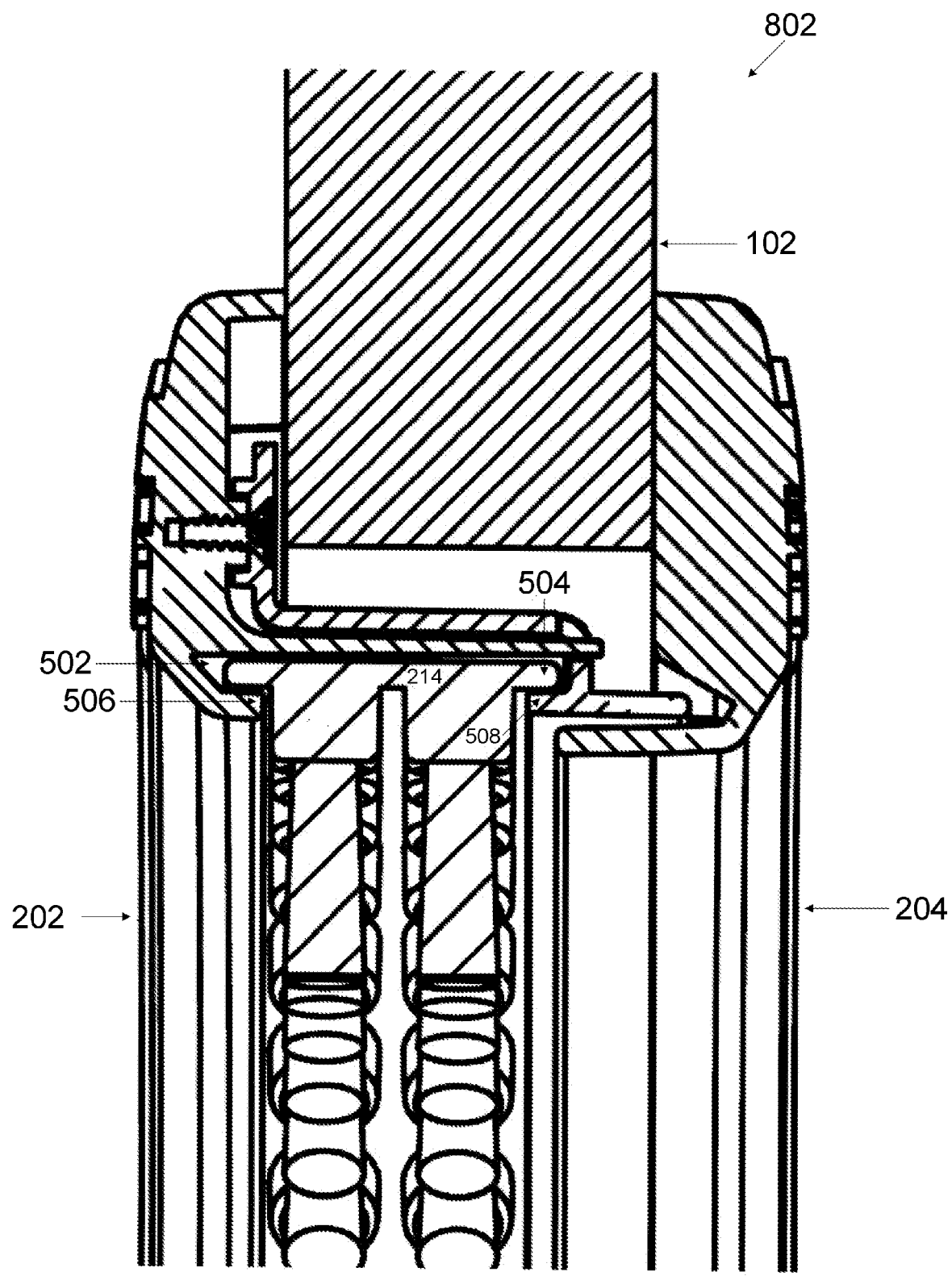
FIG. 9 is a close-up of the cross-sectional view of a portion of the pet portal grooming system.

FIG. 9 is a close-up of the cross-sectional view 802 and illustrates an embodiment of the first groove 502, the second groove 504, the first lip 506, and the second lip 508 that may be used to retain the brush backing 214.

Figure 10:
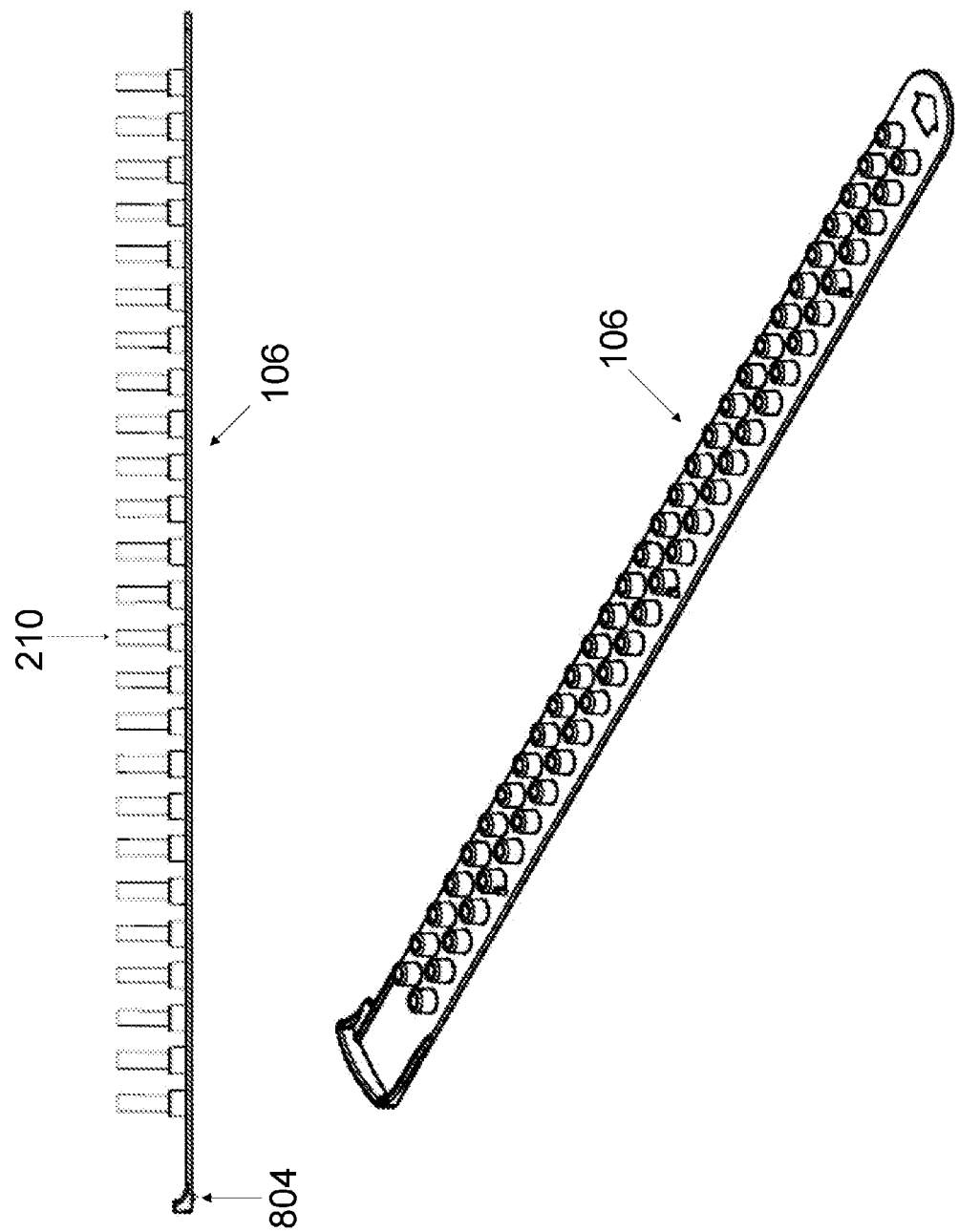
FIG. 10 is a side view of the pet portal brush and further illustrates a perspective top view of the pet portal brush, without the bristles.

FIG. 10 illustrates a side view of the pet portal brush 106 and illustrates a perspective top view of the pet portal brush 106, without the bristles. FIG. 10 further illustrates a protrusion 804 on the side of brush backing 214 opposite the cups 212 configured to interact with a depression 510 in the track to provide a mechanical resistance to the removal of brush backing 214.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The invention claimed is:

1. A pet portal grooming system, comprising:
a pet portal frame in a vertical surface, to enable a pet to pass through thea vertical surface without moving the vertical surface, wherein the pet portal frame comprises a first frame member for mounting to a first side of the vertical surface and comprises a second frame member for mounting to a second side of the vertical surface, and
a removably insertable brush, wherein the brush comprises a brush backing that comprises an elongated member with two distal ends and two side portions,
wherein the pet portal frame defines an opening in the vertical surface,
wherein the pet portal frame includes a track to receive the brush backing of the brush to retain the brush within the pet portal frame and to orient bristles of the brush towards the opening in the vertical surface,
wherein the track comprises a length that extends along the inner circumference of the pet portal frame, wherein the track further comprises two opposing recesses elongated along the length of the track,
wherein each recess is configured to slidably receive one of the side portions of the brush backing at a track opening at a first distal end of the track;
wherein the recesses are formed in the pet portal frame, and
wherein one of the recesses is contained in a part of the frame removably attachable to one of the two frame members.

2. The pet portal grooming system of claim 1, wherein:
the pet portal frame comprises a track termination at a second distal end of the track, wherein the track termination defines an end of the track and prevents travel of the brush backing in the track beyond the track termination.

3. The pet portal grooming system of claim 2, wherein:
the pet portal frame is configured to permit the brush backing to be inserted into the track and removed from the track without removing the pet portal frame from the vertical surface.

4. The pet portal grooming system of claim 3, wherein:
the track opening is configured with a means for resisting removal of the brush backing from the track.

5. The pet portal grooming system of claim 4, wherein:
the track opening means for resisting removal of the brush backing from the track comprises a depression.

6. The pet portal grooming system of claim 3, wherein:
the brush backing is configured with a means for resisting removal of the brush backing from the track.

7. The pet portal grooming system of claim 6, wherein:
the brush backing means for resisting removal of the brush backing from the track comprises a protrusion.

\* \* \* \* \*